United States Patent [19]

Maag

[11] 4,213,401
[45] Jul. 22, 1980

[54] SUPPORT ARRANGEMENT FOR A WORKPIECE TABLE OF A GEAR TESTING MACHINE

[75] Inventor: Oskar Maag, Zürich, Switzerland

[73] Assignee: Maag Zahnräder & Maschinen Aktiengesellschaft, Zürich, Switzerland

[21] Appl. No.: 958,095

[22] Filed: Nov. 6, 1978

[30] Foreign Application Priority Data

Nov. 16, 1977 [CH] Switzerland ............... 13985/77

[51] Int. Cl.² ........................................... A47B 45/00
[52] U.S. Cl. ............................................. 108/20; 269/58
[58] Field of Search ................... 108/20; 248/349; 73/162; 90/58 R, 58 B; 269/57, 58, 59, 60

[56] References Cited

U.S. PATENT DOCUMENTS

| | | | |
|---|---|---|---|
| 1,789,562 | 1/1931 | Penniman et al. | 108/20 |
| 2,527,969 | 10/1950 | Siebenkittel | 108/20 X |
| 2,561,346 | 7/1951 | De Vlieg et al. | 108/20 UX |
| 3,761,070 | 9/1973 | Ruf | 269/59 |
| 3,762,275 | 10/1973 | Imamura | 248/349 |
| 3,917,249 | 11/1975 | Constantine | 269/58 |

Primary Examiner—Roy D. Frazier
Assistant Examiner—Peter A. Aschenbrenner
Attorney, Agent, or Firm—Werner W. Kleeman

[57] ABSTRACT

A support arrangement for a workpiece table of a gear testing machine which is mounted at a machine frame by means of an antifriction bearing arrangement to be rotatable about a vertical axis. Between the machine frame and the workpiece table there are arranged, coaxial with the antifriction bearing arrangemement, two support rings which can be rotated relative to one another between a rest position and a support position and vice versa. These support rings engage with one another by means of a number of pairs of complementary inclined surfaces which ascend opposite to the direction of rotation from the support position to the rest position and can be moved, by relative rotation, out of the rest position where they enable the workpiece table to rest upon the antifriction bearing arrangement, into the support position where they relieve the antifriction bearing arrangement from the load of the workpiece table.

12 Claims, 4 Drawing Figures

SUPPORT ARRANGEMENT FOR A WORKPIECE TABLE OF A GEAR TESTING MACHINE

BACKGROUND OF THE INVENTION

The present invention relates to a new and improved construction of a support arrangement for a workpiece table of a gear testing machine which is mounted at a machine frame to be rotatable by means of an antifriction bearing arrangement about a vertical axis.

The support of such workpiece tables conventionally consists of an antifriction bearing arrangement which either is constituted by a combined radial-axial-bearing or composed of mutually separated axial bearings and radial bearings. The measuring accuracy of a gear testing machine, utilizing such workpiece table, among other things, depends upon the accuracy of the mounting and support of the workpiece table at the machine frame. The support of the workpiece table by means of the antifriction bearing or antifriction bearings thus must be free of play and radial deviation and axial deviation to a high degree. This requirement as well as the need for the workpiece table to be easily rotatable, and finally the fact that the workpiece table of a gear testing machine, in contrast to the workpiece table of machine tools, which during operation experience only negligibly small measuring forces, not however machining forces, has resulted in the workpiece table of gear testing machines being supported at relatively light antifriction bearing at the machine frame.

The invention is predicated upon the recognition that the antifriction bearings, especially axial bearings, and to a certain degree also however radial bearings, by means of which the workpiece table is supported at the machine frame, from time to time become suddenly overloaded by virtue of a rather harsh or non-gentle deposition of a heavy workpiece upon the workpiece table. This is especially true in the case of larger gear testing machines where the gears to be tested are deposited by means of a crane or the like upon the workpiece table. Here it is very difficult to avoid that the initial contact between the gear and the workpiece occurs rather extensively outside of the center of the table, with the result that the antifriction bearings are markedly eccentrically loaded. Eccentric loading of the bearings also can arise if the tested gear is again raised from the workpiece table by means of the crane. Such surge-like and/or eccentric loads can cause permanent deformation of the antifriction bearings, and therefore, can impair the measuring accuracy of the gear testing machine although the actual measuring equipment which is usually arranged at a machine frame is itself not exposed to such loads.

SUMMARY OF THE INVENTION

Hence, with the foregoing in mind it is a primary object of the present invention to provide an improved support arrangement for a workpiece table of a gear testing machine which is not afflicted with the aforementioned drawbacks and limitations of the prior art constructions.

Another and more specific object of the present invention aims at the provision of a novel support arrangement for a workpiece table of the previously mentioned type which is improved in a manner such that there can be extensively avoided in positive fashion bearing damage of the previously described type.

Now in order to implement these and still further objects of the invention, which will become more readily apparent as the description proceeds, the support arrangement of the present invention contemplates arranging between the machine frame and the workpiece table, coaxially with respect to the antifriction bearing arrangement, two support rings which can be rotated towards one another. These support rings can be brought into engagement with one another by means of a number of pairs of complementary inclined surfaces which ascend opposite to the direction of rotation from a support position into a rest position. Further, the support rings, by carrying out a relative rotation can be moved out of the rest position, where they allow the workpiece table to bear upon the antifriction bearing arrangement, into the support position where they relieve the antifriction bearing arrangement from the load of the workpiece table.

It is therefore only necessary to bring the support rings into their support position by carrying out a relative rotation, in order to thus insure that the antifriction bearing arrangement itself will not become damaged by extremely non-careful depositing of a particularly heavy gear to be tested onto the workpiece table. Thereafter the support rings are again brought into their rest position by carrying out an opposite relative rotation, so that the workpiece table together with the gear to be tested which is resting thereon and, if necessary, fixedly clamped at the workpiece table, can then in accordance with the measuring program be rotated in steps or continuously without being hindered by the support rings. The amount of time needed for the relative movement of the support rings into the support position and back again into the rest position need not be greater than the time which is saved, by virtue of the invention, in that less care is needed in depositing the gear to be tested onto the workpiece table.

It is not absolutely necessary that the support rings, in their support position, completely raise the workpiece table from the antifriction bearing arrangement. They can fulfill their function of protecting the antifriction bearing arrangement against impacts and eccentric loads even then if they only insure that the workpiece table contacts the roller bearing arrangement essentially without pressure.

It is preferable to arrange the support rings at a slight spacing radially outside of the antifriction bearing arrangement. Workpiece tables of the type coming under consideration are generally somewhat more flexible at their radial outer region than at their central region, and thus, in the case of inattentive eccentric placement of a gear to be tested upon the workpiece table, can experience elastic deformations at their radial outer region. Due to the arrangement of the support rings radially outside of the antifriction bearing arrangement the effects of such elastic deformations of the workpiece table are not transmitted to the antifriction bearing arrangement.

The inclined surfaces can be produced particularly simply by means which are conventional in the gear fabrication art if, in accordance with a preferred embodiment of the invention, they are arranged at the end faces of the support rings and configured in the manner of inclined teeth flanks of sawteeth.

The inclination angle of the inclined surfaces advantageously amounts to 2° to 20°, preferably 5° to 10°.

Furthermore, it is advantageous if the support rings are locked or braked against a reverse rotation out of the support position into the rest position. In this case the inclined surfaces of the support rings can be configured to be so steep that the support rings, after release of the locking or braking action, can return back into their rest position simply by virtue of the weight of the workpiece table and the gear resting thereon. If, however, the pitch angle of the inclined surfaces is so small that they are located within the range of self-locking, then it is possible to dispense with a locking or braking of the support rings. It is however then necessary to apply an external moment, in order to bring about a relative movement of the support rings out of the support position into the rest position.

For rotating and locking of the support rings with respect to one another it is preferable to provide a drive which is self-locking at least in the support position.

Since what is important is only a relative rotation of the support rings in relation to one another, one of the support rings can be attached at the machine frame. In this case the drive can be mounted at the machine frame and coact with the other rotatable support ring.

Independent of the fact whether both support rings are rotatable or only one of them is rotatable, there can be provided a drive for the relative rotation of the support rings which is of the type which can be moved into a position beyond dead-center, i.e., a so-called over dead-center position where the support rings are locked against a reverse rotation out of the support position into the rest position.

It is advantageous if the drive in the rest position continuously exerts a rotational moment which causes a relative rotation of the support rings into the support position as soon as the workpiece table is at least partially relieved of load. In this way there is prevented, on the one hand, that the workpiece table will be inadvertently left in its rest position when a workpiece should be placed thereon. On the other hand, surge-like overloading of the antifriction bearing, even upon lifting-off of the workpiece, can be positively prevented. The danger of such overloads especially exists in those instances when, during the lift-off a workpiece with a crane, it is found that the crane is not located exactly vertically over the workpiece table, and therefore, must be shifted before the workpiece can be completely lifted-off.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
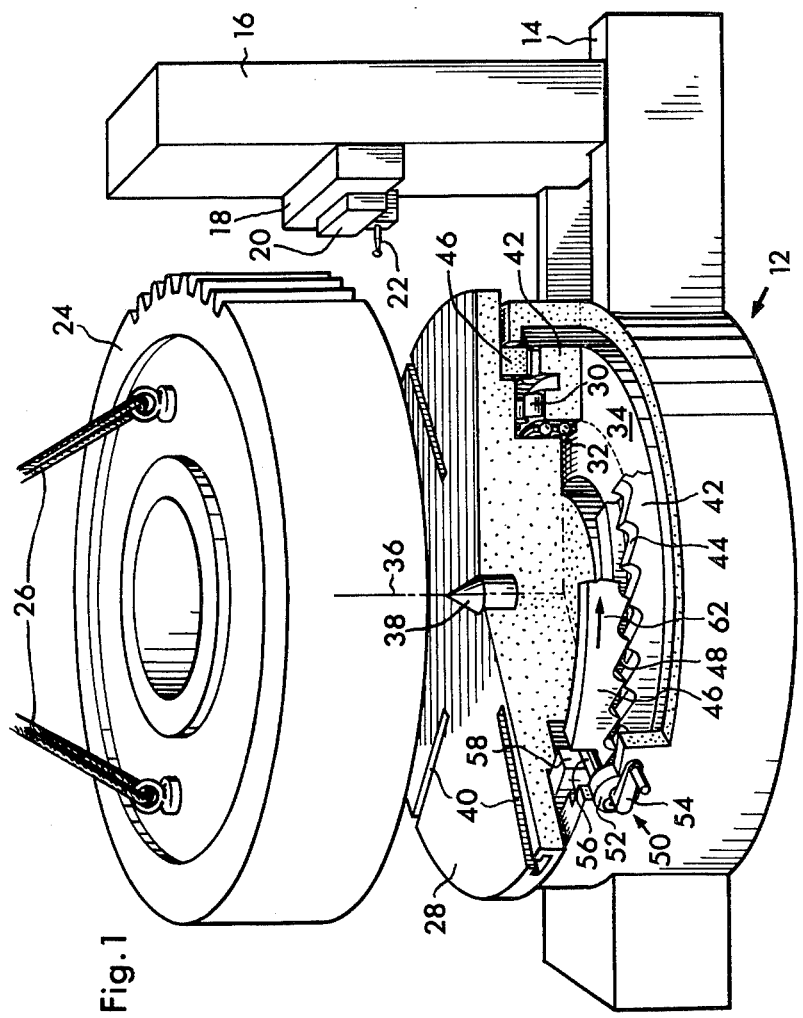
FIG. 1 is a partially cutaway view of a gear testing machine upon which there is to be placed a gear to be tested.
Figure 2:
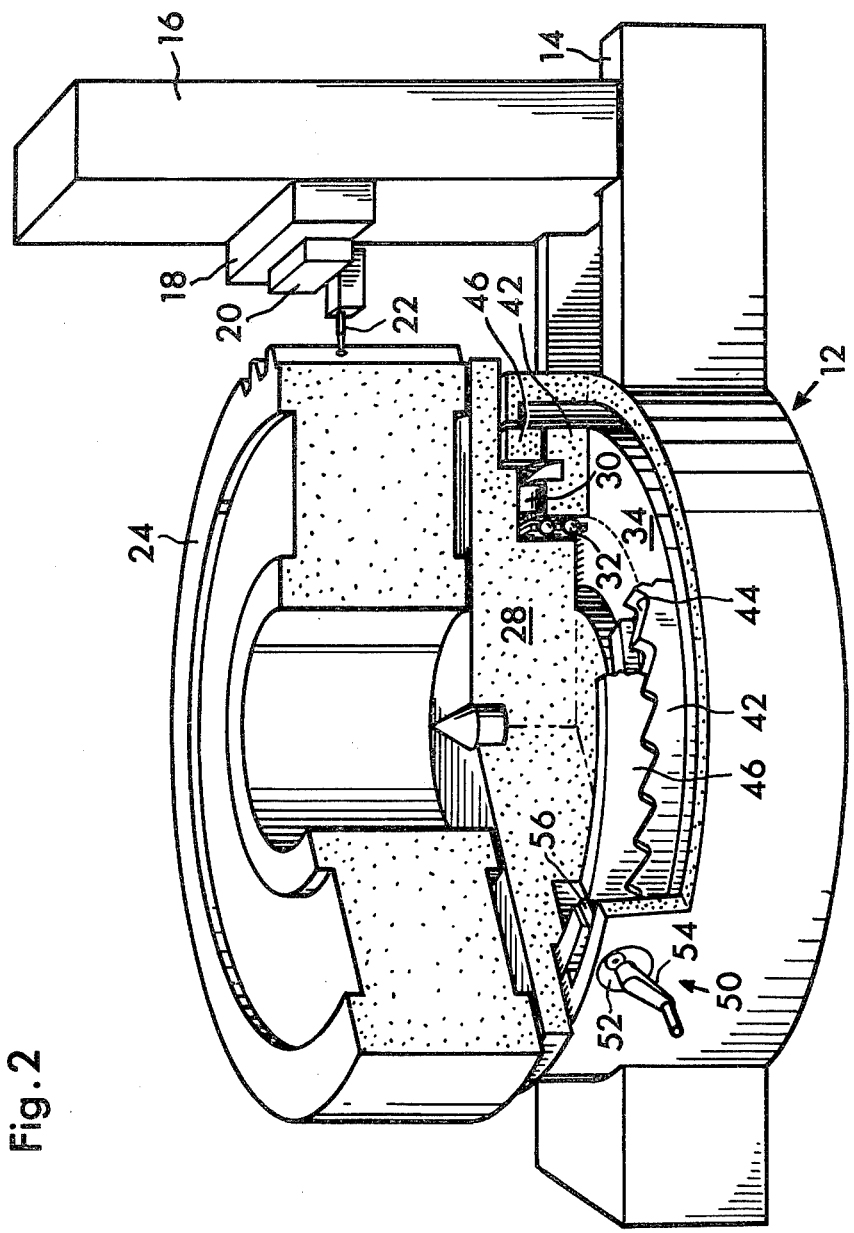
FIG. 2 illustrates the gear testing machine during testing of a gear.

Describing now the drawings, the gear testing machine illustrated by way of example in FIGS. 1 and 2 will be seen to have a machine frame 12 having a horizontal guide or guide means 14 along which there can be displaced a vertical upright or stand 16. Upon the stand 16 there is vertically displaceably guided a vertical carriage 18 and this vertical carriage, in turn, guides a cross slide or carriage 20 which is displaceable horizontally thereon. The cross slide 20 supports a feeler 22 assigned the task of scanning the teeth flanks of a gear 24 to be tested.

According to the showing of FIG. 1 the gear 24 is suspended at cables 26 of a crane or equivalent structure which is in the process of placing the gear 24 upon a workpiece table 28 of the gear testing machine.

The workpiece table 28 is mounted by means of an antifriction bearing arrangement 30, 32 to be rotatable at a ring-shaped central part or portion 34 of the machine frame 12 in such a fashion that the workpiece table 28 can be rotated about a vertical axis 36. The antifriction bearing arrangement 30, 32, in the illustrated embodiment under discussion, is composed of a roller bearing 30 constituting an axial bearing and a double roll ball bearing 32 constituting a radial bearing. In order to be able to center the gear 24 with regard to the axis 36 and to fixedly clamp such centered gear in position, the workpiece table 28 advantageously possesses a central mandrel 38 and radially arranged clamping grooves 40.

A lower support ring or support ring member 42 is attached coaxially with respect to the antifriction bearing arrangement 30, 32 and at a slight spacing radially externally thereof at the central part 34 of the machine frame 12. The support ring 42 is provided at its upper end face with a sawtooth-like profile having inclined surfaces 44. Bearing upon the lower support ring 42 is an upper support ring or support ring member 46. At the lower side or end of the upper support ring 46 there is provided a complementary sawtooth-like profile having inclined surfaces 48 parallel to the inclined surfaces 44. The upper support ring 46 is shown in FIG. 1 in a support position where it supports the workpiece table 28 in such a manner that such can either be completely lifted from the roller bearing 30 or such, in any event, does not load such to any appreciable degree. In the event that canting or deformation forces act upon the workpiece table 28, which normally load the ball bearings 32, then also such loading is taken-up by the upper support ring 46 and transmitted by means of the lower support ring 42 to the central part or portion 34 of the machine frame 12.

The upper support ring 46 is rotatable about the vertical axis 36 in relation to the lower support ring 44, opposite to the clockwise direction, out of the support position shown in FIG. 1 into the rest position shown in FIG. 2. This relative rotation can be accomplished by a suitable drive means or drive 50. This drive 50 comprises a shaft 52 which is rotatably mounted radially in the machine frame 12 with respect to the vertical axis 36 and has secured thereat a handcrank 54 and an eccentric pin 56 which is formed at the shaft 52. The eccentric pin 56 engages with slight play into a slot 58 of the upper support ring 46, slot 58 being essentially parallel to the axis 36. The range through which the drive 50 can rotate is limited by the slot 58 at whose base or floor of which there bears the eccentric pin 56, according to the showing of FIG. 1, in the support position of the upper support ring 46. This position of the drive 50 is the so-called over dead-center position, which means that the upper support ring 46 which strives, owing to the loading affected by the workpiece table 28, to rotate in the direction of the arrow 62 in FIG. 1, exerts a rotational moment upon the drive 50 which retains the eccentric pin 56 in contact with the base of the slot 58.

If the crank 54 is rotated opposite to the clockwise direction into the position of FIG. 2, then the support ring 46 rotates in the direction of the arrow 62 into its rest position where it no longer contacts the workpiece table 28, so that such is rotatable in the manner needed for testing the gear 24.

Figure 3:
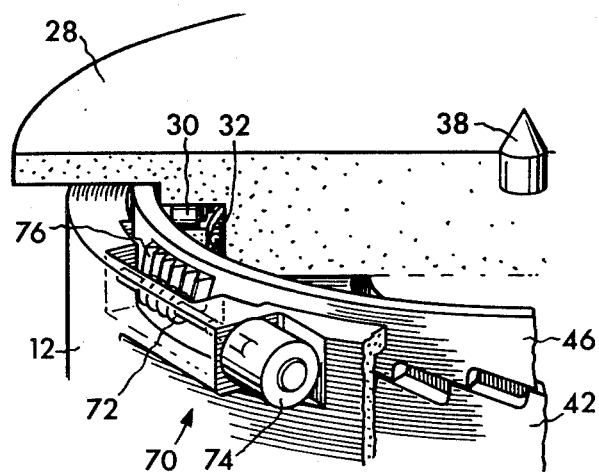
FIG. 3 illustrates a modified embodiment of the arrangement of FIG. 1.

With the variant embodiment shown in FIG. 3 there is provided, instead of the drive 50, a drive 70 which comprises a worm 72 mounted in the machine frame 12, an electric motor 74 coupled with such worm 72 and a worm gear 76 meshing with the worm 72 and attached at the upper support ring 46. The electric motor 74 is always then turned-on prior to the time that a gear 24 is placed onto the workpiece table 28 or lifted off such workpiece table. The electric motor 74 is poled in such a manner that it strives to rotate the upper support ring 46 into its support position according to FIGS. 1 and 3. Only for the reverse rotation of the upper support ring 46 into the rest position shown in FIG. 2 is the electric motor 74 briefly reversed in its polarity.

Figure 4:
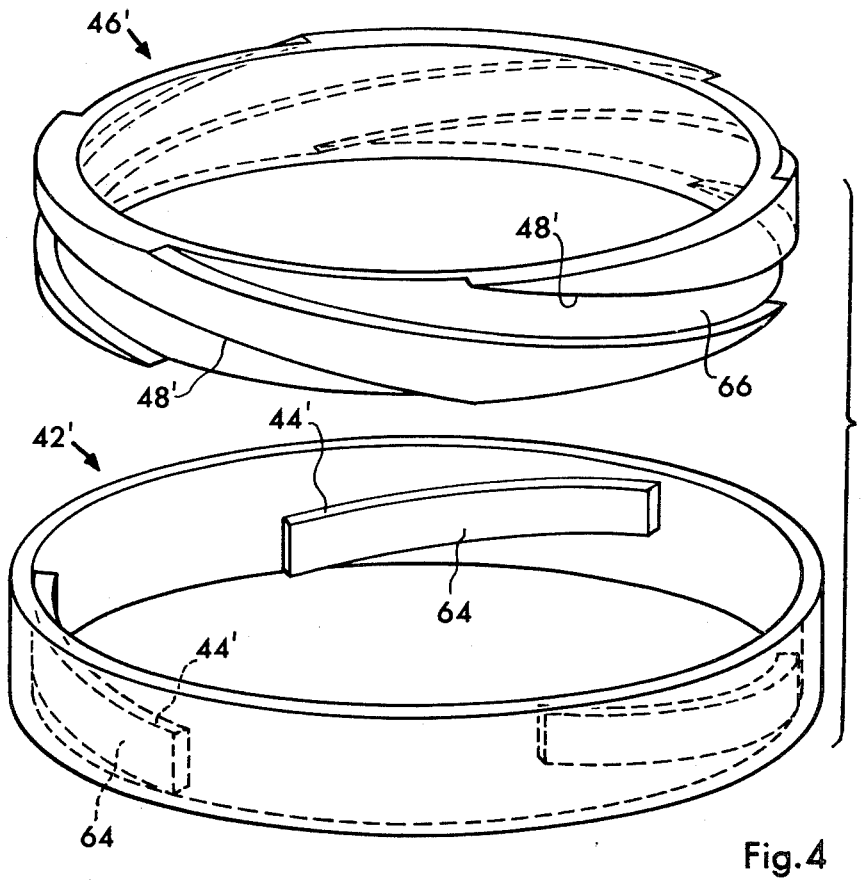
FIG. 4 shows a pair of support rings which can be used in place of the support rings shown in the arrangement of FIGS. 1 to 3.

FIG. 4 shows a lower support ring 42' and an upper support ring 46' which can be employed in place of the support rings 42 and 46, respectively. The lower support ring 42' is provided at its inner side with three spiral-like projections 64 which are angularly offset with respect to one another through 120°, each such projection 64 forming by means of its upper side or face an inclined surface 44'. The upper support ring 46' has an external diameter which is slightly smaller than the inner diameter of the part of the lower support ring 42' which is not equipped with the projections 64 and possesses three spiral-shaped grooves 66 which are offset by 120° with respect to one another, the upper groove wall of which forms inclined surfaces 48'. The upper support ring 46' can be threaded to a greater or lesser degree into the lower support ring 42', and therefore, can selectively assume a support position where it supports the workpiece table 28, or a rest position where it frees the workpiece table 28.

The inclined surfaces 44 and 48, in the arrangement of FIGS. 1 to 3, have an inclination angle of about 15° with respect to the horizontal, which under the prerequisite that the support rings are formed of steel clearly is outside of the range of self-locking. Therefore, it is necessary for preventing an unintentional relative rotation of the support rings 42 and 46 out of the support position into the rest position to provide a locking device, for instance by means of the described eccentric drive 50 or by braking thereof. The support surfaces 42' and 48' in FIG. 4, on the other hand, have an inclination of only about 7° with respect to the horizontal, which in the case of pairing steel and steel lies in the boundary region of self-locking, so that the upper support ring 46' is prevented from rotating relative to the lower support ring 42' in any event in that the machine table 28 which bears upon the upper support ring 46 is fixedly held with a hand of the operator during the placement of the gear 24. Thereafter a slight rotational moment, likewise capable of being produced by the hand of the operator, is sufficient in order to bring the support ring 46' into the rest position.

While there are shown and described present preferred embodiments of the invention, it is to be distinctly understood that the invention is not limited thereto, but may be otherwise variously embodied and practiced within the scope of the following claims. Accordingly,

What I claim is:

1. A support arrangement for a workpiece table of a gear testing machine, comprising:
    a machine frame;
    a workpiece table;
    antifriction bearing means for rotatably mounting the workpiece table at the machine frame for rotation about an essentially vertical axis;
    two support rings rotatable towards one another;
    said two support rings being arranged coaxially with respect to the antifriction bearing means and between the machine frame and the workpiece table;
    said two support rings being provided with a number of pairs of complementary inclined surfaces which ascend opposite to the direction of rotation of the support rings towards one another and engaging said support rings with one another;
    said support rings being movable, by relative rotation with respect to one another, out of a rest position where the workpiece table bears on the antifriction bearing means, into a support position where the antifriction bearing means is relieved of the load of the workpiece table.

2. The support arrangement as defined in claim 1, wherein:
    said support rings are arranged at a slight spacing radially outside of the antifriction bearing means.

3. The support arrangement as defined in claim 1, wherein:
    each of the support rings has an end surface;
    said inclined surfaces being arranged at the end surface of the related support ring and comprising inclined teeth flanks of sawteeth.

4. The support arrangement as defined in claim 1, wherein:
    the angle of inclination of the inclined surfaces is in the order of about 2° to 20°.

5. The support arrangement as defined in claim 4, wherein:
    said angle of inclination is in the range of 5° to 10°.

6. The support arrangement as defined in claim 1, further including:
    means for preventing rotation of the support rings reversibly out of the support position into the rest position.

7. The support arrangement as defined in claim 6, wherein:
    said means for preventing the reverse rotation of the support rings comprises a drive which is self-locking at least in the support position and serves for rotating and locking the support rings with respect to one another.

8. The support arrangement as defined in claim 7, wherein:
    one of the support rings is secured to the machine frame;
    said drive is mounted at the machine frame and coacts with the other rotatable support ring.

9. The support arrangement as defined in claim 7, wherein:
    said drive is movable into an over dead-center position where the support rings are locked against a reverse rotation out of the support position into the rest position.

10. The support arrangement as defined in claim 7, wherein:

said drive in the rest position continuously exerts a rotational moment which causes relative rotation of the support rings into the support position as soon as the workpiece table is at least partially relieved of load.

11. The support arrangement as defined in claim 10, wherein:
said drive includes an electric motor;
a worm driven by said electric motor;
a worm gear arranged at the rotatable support ring; and
said worm meshing with said worm gear.

12. A support arrangement for a workpiece table of a gear testing machine, comprising:
a machine frame;
a workpiece table;
antifriction bearing means for rotatably mounting the workpiece table at the machine frame for rotation about an essentially vertical axis;
two support rings rotatable relative to one another between a rest position and a support position;
said two support rings being arranged substantially coaxially with respect to the antifriction bearing means and between the machine frame and the workpiece table;
said two support rings being provided with a number of pairs of complementary inclined surfaces which ascend in the direction of relative rotation of the support rings from the rest position into the support position and engaging said support rings with one another;
said support rings being movable, by relative rotation with respect to one another, out of the rest position where the workpiece table bears on the antifriction bearing means, into the support position where the antifriction bearing means is relieved of the load of the workpiece table.

* * * * *